United States Patent
Riviere et al.

(10) Patent No.: US 11,498,021 B2
(45) Date of Patent: Nov. 15, 2022

(54) UNDERWATER WATER TREATMENT UNIT AND METHOD FOR CLEANING SAID UNIT

(71) Applicants: TOTAL SA, Courbevoie (FR); SAIPEM S.A, Montigny Le Bretonneux (FR); VEOLIA EAU—COMPAGNIE GENERALE DES EAUX, Paris (FR); VWS WESTGARTH LTD, East Kilbride (GB)

(72) Inventors: Luc Riviere, Idron (FR); Pierre Pedenaud, Lescar (FR); Didier Bigeonneau, Montbrun-lauragais (FR); Stéphane Anres, Saint Cyr L'ecole (FR); Raymond Hallot, Voisins Le Bretonneux (FR); Wayne Evans, Moor (GB); David Lothian, Ardrossan (GB)

(73) Assignees: TOTAL SA, Courbevoie (FR); SAIPEM S.A., Montigny le Bretonneux (FR); VEOLIA EAU-COMPAGNIE GENERALE DES EAUX, Paris (FR); VWS WESTGARTH LTD, East Kilbride (GB)

(*) Notice: Subject to any disclaimer, the term of this patent is extended or adjusted under 35 U.S.C. 154(b) by 191 days.

(21) Appl. No.: 16/813,309

(22) Filed: Mar. 9, 2020

(65) Prior Publication Data

US 2020/0269165 A1 Aug. 27, 2020

Related U.S. Application Data (62) Division of application No. 14/430,052, filed as application No. PCT/FR2013/052167 on Sep. 19, 2013, now abandoned.

(30) Foreign Application Priority Data

Sep. 20, 2012 (FR) ...................... 12 58853

(51) Int. Cl.
*B01D 29/66* (2006.01)
*B01D 65/02* (2006.01)
(Continued)

(52) U.S. Cl.
CPC ............. *B01D 29/66* (2013.01); *B01D 61/58* (2013.01); *B01D 65/02* (2013.01); *C02F 1/001* (2013.01);
(Continued)

(58) Field of Classification Search
None
See application file for complete search history.

(56) References Cited

U.S. PATENT DOCUMENTS

| | | | |
|---|---|---|---|
| 3,827,976 A * | 8/1974 | Stana | B01D 65/02 134/22.16 |
| 5,403,479 A | 4/1995 | Smith | |

(Continued)

FOREIGN PATENT DOCUMENTS

| | | |
|---|---|---|
| GB | 2451008 A | 1/2009 |
| WO | WO 2006/134367 | 12/2006 |

(Continued)

OTHER PUBLICATIONS

International Search Report, International Application No. PCT/FR2013/052167, filed Sep. 19, 2013, 6 pages, dated Feb. 3, 2014.

(Continued)

*Primary Examiner* — Ryan B Huang
(74) *Attorney, Agent, or Firm* — Patterson Thuente Pedersen, P.A.

(57) ABSTRACT

The invention concerns an underwater water treatment unit which has specific cleaning means which are suitable for cleaning filtration membranes in the unconventional condi- (Continued)

tions associated with use at great or very great depths, as well as a method for cleaning the membrane of the underwater water treatment unit.

11 Claims, 2 Drawing Sheets

(51) Int. Cl.

| | |
|---|---|
| *B01D 61/58* | (2006.01) |
| *C02F 1/44* | (2006.01) |
| *C02F 1/00* | (2006.01) |
| *C02F 103/10* | (2006.01) |
| *B01D 61/14* | (2006.01) |
| *B01D 61/02* | (2006.01) |
| *C02F 103/08* | (2006.01) |
| *C02F 103/36* | (2006.01) |
| *C02F 101/10* | (2006.01) |

(52) U.S. Cl.
CPC ............. *C02F 1/442* (2013.01); *C02F 1/444* (2013.01); *B01D 61/027* (2013.01); *B01D 61/147* (2013.01); *B01D 2311/103* (2013.01); *B01D 2321/08* (2013.01); *C02F 2101/101* (2013.01); *C02F 2103/08* (2013.01); *C02F 2103/10* (2013.01); *C02F 2103/365* (2013.01); *C02F 2209/02* (2013.01); *C02F 2303/16* (2013.01); *C02F 2303/20* (2013.01); *C02F 2307/00* (2013.01)

(56) References Cited

U.S. PATENT DOCUMENTS

| | | | |
|---|---|---|---|
| 7,025,885 B2 * | 4/2006 | Cote | B01D 63/043 210/650 |
| 7,600,567 B2 * | 10/2009 | Christopher | E21B 43/20 166/275 |
| 2008/0197064 A1 * | 8/2008 | Blasco Remacha | B01D 35/18 210/184 |
| 2011/0056878 A1 | 3/2011 | Matsushiro et al. | |
| 2012/0073823 A1 * | 3/2012 | McClanahan | B01D 19/0073 166/344 |
| 2012/0090641 A1 | 4/2012 | Lee | |

FOREIGN PATENT DOCUMENTS

| | | |
|---|---|---|
| WO | WO 2007/138327 | 12/2007 |
| WO | WO 2009/122134 | 10/2009 |
| WO | WO 2012/049618 | 4/2012 |

OTHER PUBLICATIONS

Davis, R. et al., "Membranes Solve North Sea Waterflood Sulfate Problems", vol. 94, No. 48, Nov. 25, 1996, pp. 59-64.
O'Donnell K., "Membrane Technology Works on North Sea Platform", Oil and Gas Journal, vol. 94, No. 49, Dec. 2, 1996.
Application and File History for U.S. Appl. No. 14/430,052, filed Mar. 20, 2015 inventors Riviere et al., as available in PAIR at www.uspto.gov.

* cited by examiner

UNDERWATER WATER TREATMENT UNIT AND METHOD FOR CLEANING SAID UNIT

RELATED APPLICATIONS

The present application is a Divisional of U.S. patent application Ser. No. 14/430,052 filed Mar. 20, 2015, which is a National Phase entry of PCT Application No. PCT/FR2013/052167, filed Sep. 19, 2013, which claims priority from FR Patent Application No. 12 58853, filed Sep. 20, 2012, said applications being hereby incorporated by reference herein in their entirety.

TECHNICAL SCOPE OF THE INVENTION

The present invention is to be found in the field of underwater applications, in particular within the oil and gas sector. More specifically, the invention concerns an underwater water treatment unit which has specific cleaning means, as well as a method for cleaning the membrane of the underwater water treatment unit.

BACKGROUND OF THE INVENTION

The injection of water into hydrocarbon fields is a well-known technique in the oil and gas sector. It is an operation which consists in injecting water, commonly known as injection water, into an oil and gas well, on the one hand to recover the hydrocarbons and on the other hand to avoid the wells collapsing, which can come about due to the drop in pressure as a result of the hydrocarbons being extracted.

The origin of the injection water generally depends on its availability and on the constraints around the site of the hydrocarbon extraction. For example, in the case of offshore extraction, using water drawn from the sea is known. Treatment steps, however, are generally essential in order to obtain from the seawater water which has the quality sufficient to enable it to be reintroduced into the underground formation. The injection water is always obtained by means of a filtration step, aiming to reduce or even eliminate suspended matter, and by means of a deoxygenation step. Often a supplementary treatment in the form of desulphurization is used if the contents of the underground formation are such that reduction in the sulfate ions is necessary.

The injection water can also be aquifer water, river or lake water, and possibly domestic or industrial wastewater. Here too, treatment steps can be necessary to obtain water which has a quality which is compatible with injection into the underground formation.

When the injection water is seawater, the presence of sulfates in the water is typically a problem if the underground formation contains barium, calcium or strontium ions. Indeed, the sulfate ions form mineral deposits (scaling) with the barium, calcium or strontium ions and these are disadvantageous to good hydrocarbon extraction. Furthermore, the presence of sulphates can be the cause of the generation by bacteria of hydrogen sulfide ($H_2S$), a toxic and corrosive gas, which can cause piping that is used for recovering hydrocarbons to corrode. The elimination of the sulfates from the water before it is injected into the underground formation is therefore often necessary.

A conventional method enabling the elimination of sulphates from the water consists in a nanofiltration membrane method which retains the multivalent ions and allows the monovalent ions to pass. Another conventional method enabling water desalination consists in a reverse osmosis method. Such methods are described, for example, in patent applications WO 2006/134367 and WO 2007/138327.

Generally, the water treatment units are placed close to the hydrocarbon field. In the case of underwater fields, said units are conventionally installed on the surface, on the offshore platform for extracting hydrocarbons or on attached floating platforms, currently called FPSO units (acronym of "Floating Production, Storage and Offloading" according to Anglo-Saxon terminology, signifying a floating unit for production, storage and offloading).

One of the major problems associated with installing water treatment units on the surface is the space required. Said units take up space. Yet the management of space on the offshore platforms is tricky as space is limited and many of the installations are essential. There is therefore a need for water treatment units which require minimum space on offshore platforms.

One solution to this problem has already been proposed in the prior art. It consists in replacing the existing treatment units by underwater units which are capable of operating underwater. In particular, international patent application WO 2009/122134 describes an underwater seawater treatment unit. The fact of putting the unit underwater also has an advantage in terms of power: the system placed in an underwater environment profits from hydrostatic pressure which is approximately proportional to the depth at which it is situated. U.S. Pat. No. 7,600,567 and patent application GB 2 451 008 also describe an underwater water treatment unit which is able to be placed underwater at a depth of between 250 and 700 meters inclusive.

Now currently, discoveries of large size hydrocarbon fields are made increasingly rarely in shallow and moderately deep waters, that is to say at depths of up to 500 meters. With the aim of ensuring renewal of reserves, it is necessary to develop new fields which are located at great depths (that is to say at a depth of between 500 and 1,500 meters inclusive) and at ultra-great depths (that is to say deeper than 1, 500 meters).

In shallow and moderately deep waters, temperature and salinity conditions as well as aquatic fauna are not radically different to conditions on the surface. By contrast, at great depths and ultra-great depths, the water temperature is approximately between 3° C. and 5° C. and the water viscosity increases with the depth. Furthermore, pressure increases by 10 MPa every 1000 meters. Thus, the environmental conditions to which the underwater water treatment units are subjected are quite specific.

In addition, the true underwater environment cannot be defined solely by conditions of pressure and temperature. It is a complex environment, with variable chemical compositions, above all including micro-organisms that are specific to great depths and to the ultra-great depths.

Said micro-organisms tend to hang onto and build up on certain surfaces, and more particularly to clog up all underwater devices rapidly. Said phenomenon of clogging up which is biological in origin is currently designated by the Anglo-Saxon term of biofouling. It is a question of the degradation or deterioration of a surface or of an object left in an aquatic environment, as typically in the sea, by the growth of living organisms such as bacteria, protozoa, algae and crustaceans.

When they are placed at great depths or at ultra-great depths, the underwater water treatment units, and in particular the filtration membranes that they contain, are therefore subject to very specific environmental conditions.

Means which are intended to reduce, or even suppress, the clogging of the filters are known by the expert. For example, patent application WO 2012/049618 describes a water treatment method which enables the risks of the membrane filters clogging up to be reduced thanks to a treatment of the retentate prior to its recycling. According to another example, patent U.S. Pat. No. 7,600,567, cited previously, describes backwashing the filtration membranes. According to one embodiment, gas can be added to the wash water. Said embodiment is not suitable for the case where the units which contain the filtration membranes are situated at great depths. Another embodiment consists in adding a biocide and/or an anti-fouling agent to the wash water. Said chemical products are for the most part organic molecules. After the wash phase, they are discharged into the environment and are therefore susceptible to causing ecological problems, especially when the filtration membranes are situated at great depths or at ultra-great depths where the biological environment is still not well understood.

It would therefore be advantageous to reduce the use of said conventional cleaning means in the very specific environmental conditions to which the units situated at great depths or ultra-great depths are subject.

Furthermore, in the case of seawater treatment units with a view to using the water as injection water in an oil well, said units preferably have to remain operational for several months, or even several years without any intervention whatsoever. Furthermore, it is preferable for the unit to be as sturdy as possible so as to reduce the number of essential maintenance operations.

It is therefore necessary to have a treatment unit which is suitable for said very specific environmental conditions at great depths and at ultra-great depths.

Furthermore, conventional means for cleaning filtration membranes are described in the scientific publications by Davis et al. ("Membranes solve North Sea waterflood sulfate problems" *Oil & Gas Journal*, Nov. 25, 1996) and by O'Donnell ("Membrane technology works on North Sea platform" *Oil & Gas Journal*, Dec. 2, 1996), and in the patents and patent applications U.S. Pat. Nos. 3,827,976, 5,403,479 and US 2012/0090641. Said documents do not provide a solution to the specific problem posed here by the environmental conditions.

It is within this context that the inventors have discovered an alternative solution, which is advantageous from an ecological point of view, enabling the filtration membranes to be washed using acid and/or alkaline solutions in underwater conditions. Gentle on the environment, and used in very diluted solutions, the acid and/or alkaline solutions can possibly be discharged into the environment after use. However, the invention also provides means which enable the discharge of said solutions into the environment to be avoided.

SUMMARY OF THE INVENTION

Said objectives, among others, are resolved by the present invention, the object of which is an underwater water treatment unit which is suitable for injection into a hydrocarbon field, said unit including:
  means for supplying the underwater unit with power;
  an underwater water treatment system which includes at least one filtration membrane, a water intake which is suitable to bring a flow of water drawn from the environment of the system into the underwater unit, a pipe connecting said water intake and said filtration membrane, a discharge pipe for treated water and at least one supply pump which is suitable for filtering the water;
  a hydraulic circuit for cleaning said membrane, forming a loop between the inlet and the outlet of said membrane, and having a discharge pipe;
  at least two water storage tanks, each water tank being connected to the cleaning circuit;
  at least one tank for storing a cleaning product selected from among an acid and a base, the cleaning product tank being connected to the cleaning circuit;
  at least one cleaning pump which is suitable for setting the liquids in the cleaning circuit into motion;
said filtration membrane being provided with at least one heating means, and at least one of the water tanks being provided with at least one means for heating the tank.

A further object of the invention is a method for cleaning the filtration membrane of an underwater unit such as defined previously, said method including the steps consisting in:
  a) cutting off the inlet of water into said filtration membrane;
  b) injecting water contained in one of the water storage tanks into the hydraulic cleaning circuit, and making said water circulate in a loop in the hydraulic cleaning circuit using the cleaning pump;
  c) heating the filtration membrane up to a temperature of between 15° C. and 40° C. inclusive using the heating means;
  d) injecting a cleaning product contained in at least one storage tank into the hydraulic cleaning circuit;
  e) discharging the contents of the hydraulic cleaning circuit via the discharge pipe;
  f) injecting water contained in one of the water storage tanks into the hydraulic cleaning circuit again, and making said water circulate in a loop in the hydraulic cleaning circuit;
  g) discharging the contents of the hydraulic cleaning circuit via the discharge pipe again.

DETAILED DESCRIPTION OF THE INVENTION

In the present application, the expression "between . . . and . . . inclusive" must be understood as including the limit values.

The underwater unit according to the invention is designed for treating water in such a way that said water is able to be injected into a hydrocarbon field. The water which is treated is preferably seawater and the water obtained is injection water.

In order to perform the water treatment, the underwater unit according to the invention first of all includes a means for supplying the underwater unit with power and an underwater water treatment system. Said water treatment system comprises at least one filtration membrane, a water intake which is suitable to bring a flow of water drawn from the environment of the system into the underwater unit, a pipe connecting said water intake and said filtration membrane, a discharge pipe for treated water and at least one supply pump which is suitable for filtering the water.

The filtration membranes are devices that are well known to the expert which enable different components of a liquid flow to be separated. The nature of the separation is determined in part by the dimension of the pores in the membranes.

According to the IUPAC classification:
a microfiltration membrane has macropores the diameter of which is in excess of 50 nm,
an ultrafiltration membrane has mesopores the diameter of which is between 2 nm and 50 nm inclusive,
a nanofiltration membrane has micropores the diameter of which is less than 2 nm.

On the other hand, osmosis membranes are specific membranes which are well known to the expert. An osmosis membrane is a semi-permeable membrane which only allows solvent (in general water) to pass and not other substances in solution.

The filtration membrane of the present invention can be a microfiltration membrane, an ultrafiltration membrane, a nanofiltration membrane, or even a reverse osmosis membrane. In addition, according to a more advantageous embodiment, the filtration membrane in the present invention is a membrane for desulfation. The term "membrane for desulfation" refers in the present invention to a membrane which enables sulfate ions to be separated from water. It is a particularly advantageous embodiment for the oil industry as said membranes enable the elimination of sulfates in the seawater which is intended to be re-injected into the underground formations which contain hydrocarbons.

Among the nanofiltration membranes for the desulfation of seawater, the membranes SR90 of DOW Filmtec and the NANO-SW of Hydranautics can be cited, among others.

The underwater water treatment system can include several filtration membranes, arranged in series and/or in parallel, which are identical or different. According to a preferred embodiment, the underwater water treatment system includes a nanofiltration membrane and an ultrafiltration membrane, said ultrafiltration membrane being situated upstream of said nanofiltration membrane. The underwater water treatment system can therefore include, in order with respect to the normal flowing of the water flow in the system:
a water inlet;
a pipe connecting said water inlet and an ultrafiltration membrane;
said ultrafiltration membrane;
a pipe connecting said ultrafiltration membrane and a nanofiltration membrane;
said nanofiltration membrane; then
on the one hand, a discharge pipe downstream of said nanofiltration membrane; and on the other hand, a discharge pipe for the retentate of the nanofiltration membrane.

According to another embodiment, the underwater water treatment system includes a microfiltration membrane and/or an ultrafiltration membrane.

Furthermore, the underwater water treatment system can include other filters which can be selected, for example, from among a sieve and a pre-filter. A sieve is a grid having a mesh that is more or less fine or a surface that is perforated with holes. The job of a sieve is generally to separate different sized solid particles from a liquid flow, the size of the particles separated depending on the size of the mesh or the holes in the filter. The term "pre-filter" designates a filter that is likely to stop relatively large-sized solid particles, that is to in excess of 100 micrometers. The pre-filter enables coarse filtering.

The flow of water enters the underwater water treatment system via a water inlet. A water inlet is a conventional system which includes an opening enabling a flow of water to enter the system. The water inlet can possibly be provided with a strainer screen which holds back large diameter solid elements, thus avoiding the filtration system quickly becoming blocked by large elements.

The location of the water inlet determines the quality of the water entering the underwater water treatment system. In an advantageous manner, the water inlet can be mobile, for example by means of a telescopic system which enables the site of the water inlet to be varied without modifying the location of the underwater water treatment unit itself. In particular, a telescopic system or a rewinding means can allow the level of the water inlet to be moved, referenced with respect to the bottom of the water or to the surface.

In the underwater water treatment system of the present invention, the filtration membrane can be placed in a specific module which includes two chambers, a first chamber upstream of the filtration membrane and a second chamber downstream of the filtration membrane, the filtration membrane forming a partition between the two chambers. The first chamber upstream is provided with at least one pipe which enables the inlet of the water flow. The second chamber downstream is provided with at least one discharge pipe. The first chamber upstream is possibly also equally provided with a second discharge pipe. The dimensioning of the chambers upstream and downstream can be made by the expert, in particular in terms of the type of filter and the nature of the speed of the flow to be filtered.

Conventionally, the flow of water can be brought into the first chamber of the filter by a supply pipe. The portion of the flow which crosses the filter and reaches the second chamber, downstream of the filter, is commonly called the filtrate. The portion of the flow which is retained by the filter is commonly called the retentate. According to the type of filter, the retentate can be solid, liquid or a mixture of the two.

In order to make the water circulate across the filter, the underwater water treatment system according to the invention includes at least one pump which is suitable for filtering water. Said pump can be situated on the pipe which connects the water inlet and the filter. The pump can be controlled by an electronic system. Said electronic system can be controlled by a pre-recorded program which does not require the intervention of an operator. As an alternative to this, it can be controlled by an operator, preferably located on the surface, and the information exchanged between the operator and the electronic system can be transmitted via cable or online (for example, over the air, notably wirelessly or acoustically in the water).

The job of the discharge pipe downstream of the filter is to discharge the filtrate from the system. Said filtrate constitutes treated water which is suitable to be used as injection water in a hydrocarbon field. The filtrate discharge pipe is therefore preferably connected to a well for extracting hydrocarbons.

The underwater water treatment system according to the invention can possibly include a discharge pipe for the filter retentate. Not recovering the retentate is preferred and it is therefore preferably released directly into the environment, close to the underwater water treatment system.

In order to be able to realize the different steps of treatment, and in particular to be able to operate the supply pump which is suitable for filtering water, the underwater water treatment system, and more generally the underwater water treatment unit assembly needs a source of energy. This is why the underwater water treatment unit includes a means for supplying said underwater unit with power.

According to a first embodiment, the underwater water treatment unit is supplied with power from the surface via an umbilical. An umbilical is a well-known device in the area of underwater oil production. The umbilical can conduct an electric current. It can therefore supply the underwater water treatment unit with electricity from the surface. In particular, the umbilical can connect the underwater water treatment unit to a floating control unit, typically a boat or a floating platform, for example in line with the submerged underwater water treatment unit, or in a satellite field a few kilometers from the surface unit. The same umbilical can ensure several functions at once. Typically, the same umbilical can serve as a pathway for supplying the underwater water treatment unit with power and for transmitting instructions.

According to a second embodiment, the underwater water treatment unit is electrically autonomous and is supplied with power thanks to a battery located within the underwater water treatment unit. The presence of batteries is not preferred on account of their volume and weight. However, the advantage of said embodiment is to make the underwater water treatment unit autonomous and easily movable.

The underwater water treatment unit can preferably be in a compact form, with the possible exception of the water inlet and the discharge pipe which can extend beyond the structure. The dimensions of said structure can be between 8 m (length)×5 m (width)×5 m (height) and 20 m (length)× 10 m (width)×15 m (height) inclusive. The total weight of the unit out of the water is between 100 tons and 800 tons inclusive.

The underwater water treatment unit is intended to be placed underwater at a depth of at least 500 meters, notably of at least 800 meters. The depth of the underwater water treatment unit is in a preferred manner between 800 meters and 3000 meters inclusive, in a more preferred manner between 1000 meters and 3000 meters inclusive, and in an even more preferred manner between 1500 meters and 3000 meters inclusive.

In a preferred manner, the underwater water treatment unit is placed in the sea, and the flow of water drawn from the environment is a flow of seawater.

The underwater water treatment unit is subject to an outside pressure which, in a preferred manner, is between 80 and 300 bar inclusive, said pressure naturally being a function of the depth at which the underwater water treatment unit is positioned. The temperature existing at the site where the underwater water treatment unit is positioned is also a function of the depth at which the underwater water treatment unit is situated, but also more generally of the geographic location where the underwater water treatment unit is placed. For example, if the underwater water treatment unit is positioned at a depth of 3000 meters in the Gulf of Guinea, the temperature of the water will be approximately 4° C. If the underwater water treatment unit is positioned at a depth of 500 meters, notably at 800 meters, in the Arctic Ocean, the temperature of the water will be approximately −2° C. In a general manner, the underwater water treatment unit is subject to an outside temperature of between 20° C. and −2° C. inclusive, preferably between 14° C. and −2° C. inclusive.

It is well known that underwater the service life and the filtration capacity of the filtration membranes can be greatly reduced by the phenomenon of biofouling which causes the filters to clog up. However, the conventional means for cleaning filtration membranes have been shown to be unsuitable for the very specific environmental conditions to which an underwater water treatment unit which is situated at great depths or at ultra-great depths is subject.

Cleaning in situ enables the frequency of acting on the filtration membranes (either to replace them or to clean them) to be reduced.

This is why the underwater water treatment unit according to the present invention further includes specific cleaning means.

The underwater water treatment unit includes:
  a hydraulic circuit for cleaning said membrane, forming a loop between the inlet and the outlet of said membrane, and having a discharge pipe;
  at least two water storage tanks, each water tank being connected to the cleaning circuit;
  at least one tank for storing a cleaning product selected from among an acid and a base, the cleaning product tank being connected to the cleaning circuit;
  at least one cleaning pump which is suitable for setting the liquids in the cleaning circuit into motion.

Furthermore, the filtration membrane of the underwater water treatment system is provided with at least one heating means, and at least one of the water tanks is provided with at least one means for heating the tank.

The hydraulic cleaning circuit according to the invention, with the aid of the appropriate pipes, forms a closed circuit of which the filtration membrane is part. The hydraulic cleaning system circuit includes a discharge pipe which can be controlled by a valve. As long as said discharge valve is kept closed, a liquid flow can be circulated in the hydraulic cleaning circuit, and it flows following said loop in a continuous manner, continually crossing the filtration membrane. The opening of the discharge valve enables the loop to be broken and the liquid flow to be discharged out of the hydraulic cleaning circuit, for example when the cleaning is completed.

According to a preferred embodiment, the underwater water treatment system includes a nanofiltration membrane, and an ultrafiltration membrane, said ultrafiltration membrane being situated upstream of said nanofiltration membrane. In this case, the hydraulic cleaning circuit according to the invention can advantageously form:
  a loop between the inlet and the outlet of the nanofiltration membrane, or
  a loop between the inlet and the outlet of the ultrafiltration membrane, or
  two loops between the inlet and the outlet of the nanofiltration membrane on the one hand and between the inlet and the outlet of the ultrafiltration membrane on the other hand, valves being situated in the loops in order to allow the membrane desired for cleaning to be selected.

The choice of the number of loops in the hydraulic cleaning circuit can depend on the need for cleaning the underwater water treatment unit. Said need can vary in terms of the type of filtration membranes used, but also in terms of the aquatic environment of the underwater water treatment unit, for example the water quality, its temperature, its pressure, its chemical composition and the micro-organisms that it contains.

In a preferred manner, when the underwater water treatment system includes a nanofiltration membrane and an ultrafiltration membrane, the hydraulic cleaning circuit preferably forms two loops between the inlet and the outlet of the nanofiltration membrane on the one hand and between the inlet and the outlet of the ultrafiltration membrane on the other hand, valves being situated in the loops in order to select the membrane which requires cleaning.

The means for cleaning the underwater water treatment unit according to the invention include a certain number of storage tanks. At least two storage tanks are intended for storing water. At least one storage tank is intended for storing a cleaning product which is selected from among an acid and a base.

The tanks are suitable for fulfilling their storage function in an aquatic environment, at the temperature and at the pressure to which the underwater water treatment unit is subject. The dimensioning of the tanks can be calculated by the expert in terms of the quantity of water and of cleaning product necessary for cleaning the filtration membrane for the desired amount of time. In a preferred manner, the tanks are dimensioned in such a manner that the underwater unit is autonomous for at least six months. As the space required is not a limiting constraint within the framework of an underwater water treatment unit, sturdy equipment is preferred, requiring the least possible maintenance.

In a specific embodiment, the storage tank or tanks are flexible, as a result of which they collapse or flatten when the liquid is withdrawn when the tank is drained.

In another specific embodiment, the flexible storage tank or tanks are surrounded by a rigid shell enabling them to tolerate low overpressures and enabling the water to circulate within the rigid structure when the tank collapses.

Each tank is connected to the cleaning circuit. In a preferred manner, a valve is arranged at the outlet of each tank so as to be able to control the opening and closing of the each tank.

The acid which can be used as a cleaning product can be an organic or mineral acid. It can be chosen from among the conventional compounds known to the expert. It can be selected, in particular, from the group consisting of citric acid and hydrochloric acid. The acids are suitable for dissolving the mineral deposits.

The base that can be used as a cleaning product can be an organic or mineral base, in a preferred manner a mineral base. It can be chosen among the conventional compounds known to the expert. It can be chosen in particular from among caustic soda or a detergent having an exclusive chemical formula. The bases are specially developed to eliminate organic colonization or microbial residues. The cleaning products are preferably in the form of concentrated aqueous solutions, the concentration can be between 1% and 4% inclusive.

According to a preferred embodiment, the underwater unit includes at least two storage tanks for the cleaning product, at least one of the tanks being a storage tank for an acid and at least one of the tanks being a storage tank for a base, the acid and base tanks being connected to the cleaning circuit.

In a general manner, the underwater water treatment unit is subject to specific pressure and temperature conditions as a result of its submersion. Especially, the underwater water treatment unit is subject to an outside temperature of between 20° C. and −2° C. inclusive, in a preferred manner between 14° C. and −2° C. inclusive. The inventors have noted that, in these conditions, the means for cleaning have had to be suitable.

This is why the underwater water treatment unit further includes means for heating. The filtration membrane of the underwater water treatment unit is provided with at least one heating means, and at least one of the water tanks is provided with at least one means for heating the tank.

Said means for heating advantageously enable the filtration membrane to be cleaned at a temperature that is higher than the outside temperature. The heating means can be placed in an appropriate manner close to the filtration membrane in order to heat the filtration membrane and close to or in the water tank in order to heat the water contained therein.

The heating means can be supplied with power by the means for supplying the underwater unit with power.

Heating can be effected, for example, at one location of the circulation loop and the hot liquid can be continuously circulated across the filtration membrane.

As an alternative to this, the heating means are such that they enable the water surrounding the filtration membrane to be heated rather than heating the circulation loop directly.

According to a preferred embodiment, the underwater water treatment unit includes at least three water storage tanks, at least two of the water tanks being provided with at least one means for heating the tank.

The underwater water treatment unit further includes at least one cleaning pump suitable for setting the liquids in the cleaning circuit into motion. Said cleaning pump can be supplied with power by the means for supplying the underwater unit with power. In a preferred manner, the cleaning pump is placed in the hydraulic cleaning circuit.

In an advantageous manner, the supply pump and the cleaning pump can be mounted on the same shaft. Said embodiment enables the sturdiness of the underwater unit according to the invention to be increased. This represents an important advantage as the maintenance of the unit, when it is submerged at a great depth or an ultra-great depth, is complicated and costly.

The underwater water treatment unit according to the invention can therefore be used to treat a flow of water drawn from the aquatic environment of the unit, and to treat it in such a manner that it is usable as injection water. In normal mode, the method of treating water using the underwater unit according to the invention includes the steps consisting in:
 introducing a flow of water into the underwater water treatment unit via the water inlet;
 introducing said flow in the underwater water treatment system up to the filtration membrane;
 obtaining a filtrate downstream of said filtration membrane; and
 injecting said filtrate at least in part into a hydrocarbon field.

The underwater water treatment unit can be placed underwater at a depth of at least 500 meters. Furthermore, the hydrocarbon field into which the treated water is injected is preferably an offshore field.

The filtration membrane can be cleaned from time to time in order to maintain its filtration capacity and to prevent it clogging up.

An object of the present invention is a method for cleaning the membrane of an underwater unit such as defined previously, said method including the steps consisting in:
 a) cutting off the inlet of water into the filtration membrane;
 b) injecting water contained in one of the water tanks into the hydraulic cleaning circuit, and making said water circulate in a loop in the hydraulic cleaning circuit using the cleaning pump;
 c) heating the membrane up to a temperature of between 15° C. and 40° C. inclusive using the heating means;
 d) injecting a cleaning product contained in at least one storage tank into the hydraulic cleaning circuit;
 e) discharging the contents of the hydraulic cleaning circuit via the discharge pipe;

f) injecting water contained in one of the water tanks into the hydraulic cleaning circuit again, and making said water circulate in a loop in the hydraulic cleaning circuit;

g) discharging the contents of the hydraulic cleaning circuit via the discharge pipe again.

Step a) consists in cutting off the inlet of water into the filtration membrane. If it is desirable, however, not to cut off the production of water treated for injection, it is possible to provide several filtration membranes and/or several water treatment systems, arranged in parallel in the same underwater unit.

Once the membrane has been isolated from the normal water treatment circuit, in a step b), water contained in one of the water tanks is injected into the hydraulic cleaning circuit, and said water is made to circulate in a loop in the hydraulic cleaning circuit using the cleaning pump.

In a preferred manner, the water injected during step b) into the hydraulic circuit is at the same temperature as the filtration membrane. The filtration membrane is therefore a priori at the outside ambient temperature as it has been in contact with the water drawn from the outside environment during the normal water treatment. The water injected during step b) into the hydraulic circuit is therefore in a preferred manner at the outside ambient temperature, which can be between 20° C. and −2° C. inclusive, in a preferred manner between 14° C. and −2° C. In a preferred manner, said water can be treated water which has been obtained by means of the water treatment method thanks to the underwater unit itself.

The length of step b) can be determined by the expert in such a way that the flow of water into the hydraulic cleaning circuit is constant.

Step c) of the cleaning method according to the invention consists therefore in heating the filtration membrane up to a temperature of between 15° C. and 40° C. inclusive using the heating means. Said step can be performed by starting up the heating means which is situated close to the filtration membrane. As the circulation of the water in the hydraulic cleaning circuit is maintained, the heating of the filtration membrane also causes the water circulating in the hydraulic cleaning circuit to heat. As an alternative to this, said step can be performed by heating at a location on the circulation loop and by maintaining circulation of hot liquid across the filtration membrane. In a preferred manner, step c) is finished when the filtration membrane and the water circulating in the hydraulic cleaning circuit have reached a desired stable temperature. The expert can determine the length of said step c) in terms of, in particular, the initial temperature of the membrane and of the water, the volume, the flow of water and the heating power. The desired temperature to be reached during step c) can be defined in terms of the type of cleaning product which is injected during the subsequent step d).

When step c) is finished, during step d) a cleaning product which is contained in at least one storage tank is injected into the hydraulic cleaning circuit. The injection can be controlled by means of a valve which is situated at the inlet of the storage tank. The quantity of cleaning product injected can depend of the type of product, on its concentration in the storage tank and on the desired cleaning effect.

The circulation of water in the hydraulic cleaning circuit is maintained during step c). The cleaning product is diluted or dispersed in the water. The means for heating the filtration membrane, in a preferred manner, is kept operating in such a manner that the temperature remains stable.

The filtration membrane is therefore crossed by a flow which contains cleaning product. The circulation of said flow is maintained in the hydraulic cleaning circuit for a sufficient amount of time to ensure that the cleaning of the filtration membrane is effective.

At the end of said cleaning, the contents of the hydraulic cleaning circuit are discharged during step e) of the cleaning method via the discharge pipe. The contents of the hydraulic cleaning circuit can be discharged directly into the environment surrounding the underwater water treatment unit, in particular directly into the sea when the cleaning products used are not toxic to the flora and fauna present in the environment. As an alternative to this, when the discharge of the cleaning products risks becoming an environmental problem, the contents of the hydraulic cleaning circuit can be discharged into the water tanks which have been drained following step b). The discharging can be controlled thanks to a valve which is situated in the discharge pipe.

The unit can therefore further include a discharge pipe which enables the contents of the hydraulic cleaning circuit to be discharged into the water tank or tanks.

When the entire contents of the hydraulic cleaning circuit have been discharged, the discharge pipe can be closed again and in a step f), water contained in one of the water tanks is injected into the hydraulic cleaning circuit again, and said water is made to circulate in a loop in the hydraulic cleaning circuit. Said step f) in an advantageous manner enables the filtration membrane to be rinsed and to be freed of any possible cleaning product residues. In a preferred manner, said water which is injected into the hydraulic cleaning circuit during step f) can be treated water which has been obtained by means of the method for treating water thanks to the underwater unit itself. The length of step f) for rinsing can be determined by an expert so that the rinsing procedure is effective.

In a particular embodiment, steps e) and f) are performed simultaneously.

At the end of said step f), the contents of the hydraulic cleaning circuit are once again discharged via the discharge pipe during step g). In a preferred manner, the contents of the hydraulic cleaning circuit are discharged directly into the environment surrounding the underwater water treatment unit, in particular directly into the sea. The discharging can be controlled thanks to a valve which is situated in the discharge pipe.

At the end of step g), the filtration membrane can be advantageously put back into service. It can be used once again in the method for treating water. It is possible to re-open the inlet for water drawn from the environment.

The cleaning method can be implemented on a one-off basis, or, in a preferred manner, on a regular basis over time. The cleaning method according to the invention can be implemented at a frequency of between once a week and once a year inclusive, in a more preferred manner between once a month and once every six months.

The cleaning method according to the invention is particularly suitable for cleaning filtration membranes in the unusual conditions associated with use at great depths or at ultra-great depths. The objectives of the invention, which are to obtain efficient cleaning, without however causing damage to the environment, and without requiring complex and costly maintenance, are obtained by the method of the present invention which includes, in particular, a step for heating the filtration membrane.

Certain filtration membranes, in particular ultrafiltration membranes, can however be damaged by thermal shock. A thermal shock can take place when the membrane is heated, during step c) of the method according to the invention, and/or when the cleaning is finished and the membrane is put back into service in order to resume the water treatment in the water treatment system of the unit.

To prevent thermal shocks, in a preferred manner the temperature is increased slowly during step c) of the cleaning method according to the invention.

Furthermore, to avoid thermal shocks due to the drop in temperature, in a preferred manner the water injected into the hydraulic cleaning circuit during step f) is heated to a temperature of between 15° C. and 40° C. inclusive thanks to the heating means of the water storage tank or tanks. The cleaning method can further include a step which consists in heating the water injected into the hydraulic cleaning circuit in step f) to a temperature of between 15° C. and 40° C. inclusive thanks to the means for heating the tank or tanks containing the water. Said step can be performed by starting up the heating means which is situated close to or in said tank. In an advantageous manner, the temperature of the water can be the same as the temperature of the filtration membrane obtained during step c). Said heating step can be implemented at the appropriate moment to ensure that the water is at the desired temperature at the moment of implementation of step f).

When said rinsing water circulates in the loop in the hydraulic cleaning circuit, in a preferred manner the means for heating the filtration membrane is stopped. In a preferred manner, the rinsing step can therefore be continued for a length of time that is sufficient to enable the temperature of the filtration membrane and of the water which is circulating in the hydraulic cleaning circuit to drop, until, in a preferred manner, the outside ambient temperature is obtained. In a preferred manner, cooling is effected slowly and naturally, by contact with the outside environment.

In a preferred manner, the cleaning product injected into the hydraulic cleaning circuit during step d) is an acid, and in a more preferred manner, the cleaning product injected into the hydraulic cleaning circuit during step d) is citric acid. Cleaning the filtration membrane with acid allows the mineral deposits which can clog up the membrane to be dissolved. When the cleaning product injected into the hydraulic cleaning circuit during step d) is an acid, in a preferred manner the temperature obtained during step c) is between 20° C. and 40° C. inclusive and in a more preferred manner is between 25° C. and 35° C. inclusive.

As an alternative to this, the cleaning product injected into the hydraulic cleaning circuit during step d) is a base. Cleaning the filtration membrane with the base enables organic and microbial matter to be eliminated. When the cleaning product injected into the hydraulic cleaning circuit during step d) is a base, in a preferred manner the temperature obtained during step c) is between 20° C. and 40° C. inclusive, in a more preferred manner is between 30° C. and 40° C. inclusive and in a manner even more preferred is between 35° C. and 40° C. inclusive.

According to an embodiment of the present invention, the filtration membrane can be cleaned several times, in a successive manner, with different cleaning products. The cleaning method according to the invention can include, between step f) and step g), the steps consisting in:

d') injecting a cleaning product that is different from the product injected during step d) into the hydraulic cleaning circuit, a said product being contained in at least one storage tank;

e') discharging the contents of the hydraulic cleaning circuit via the discharge pipe; and f') injecting the water contained in one of the water storage tanks into the hydraulic cleaning circuit again, and making said water circulate in a loop in the hydraulic cleaning circuit.

The steps d') to f') correspond to steps d) à f), with the difference that the cleaning product injected during step d') is different to the cleaning product injected during step d). The steps d') to f') can be as described previously for steps d) to f). In particular, the water injected into the hydraulic cleaning circuit during step f') can possibly be heated to a temperature of between 15° C. and 40° C. inclusive thanks to the means for heating the tanks or tanks containing the water According to a preferred embodiment, including steps a) to f), then d') to f'), then g), the cleaning product injected into the hydraulic cleaning circuit during step d) can be a base and the cleaning product injected into the hydraulic cleaning circuit during step d') can be an acid. Said embodiment can be advantageous for cleaning in a more effective manner than cleaning with one single cleaning product. The cleaning may be carried out more frequently.

In a preferred manner, the method for cleaning can subsequently include, after step g), the steps consisting in:

h) resuming the water treatment in the water treatment system of the unit; and i) replacing the water which has been used during steps b) and f), and possibly f'), by injecting water obtained leaving the treatment system into the water storage tanks.

It is understood that, if the underwater water treatment system includes several filtration membranes, a cleaning method can be implemented for each of said membranes, in a preferred manner each cleaning method being suitable for each membrane. Furthermore, each cleaning method can be performed at different frequencies.

One of the advantages of the cleaning method according to the invention is that it can be completely automated. Each step of the method can be triggered without direct human intervention, by electronic systems. This is particularly advantageous insofar as the underwater water treatment unit is situated in deep water. Any direct intervention requires either the use of underwater robots or raising the unit to the surface, which in all cases is a long, tricky, costly operation. According to one embodiment, the method can be remote-controlled by an operator, in a preferred manner located on the surface, and the information exchanged between the operator and the electronic system can be transmitted via cable (for example an umbilical) or online (for example, wirelessly). According to another embodiment, the electronic system can be controlled by a pre-recorded program which does not require the intervention of an operator.

Furthermore, the underwater water treatment unit according to the invention can include one or several other means intended to reduce, or even eliminate, the clogging up of the filtration membrane. Said means can be chosen from among the group constituted by a recycling circuit which connects the treated water discharge pipe and the pipe upstream of the filtration membrane, a backwash circuit, and one or several biocide tanks, at least one of said tanks being placed so as to enable the injection of biocide into the pipe connecting the water inlet and the filter, in a preferred manner close to the water inlet.

A recycling circuit connecting the treated water discharge pipe and the pipe upstream of the filtration membrane enables part of the filtrate recovered at the outlet of the filtration membrane to be moved to the water flow which is intended to cross said filtration membrane. The effect of said recycling system is to dilute the water flow intended to cross the filtration membrane, which, on the one hand, increases the incoming liquid flow rate, and, on the other hand, improves the quality of the incoming water flow, thus facilitating its filtration.

Backwashing is a method known for cleaning filters. It consists in making a flow of water circulate in the opposite direction to the direction of flow of the flow of water across the filter in normal mode. By doing so, the water circulating against the current can take with it elements that are more or less coarse which clog up the filter. A backwashing step can include the stopping of the normal inlet of the water flow into the filtration membrane, the inlet of a water flow into the underwater water treatment system via a second water inlet, the pipe for said flow up to the face of the filtration membrane is initially on the downstream side, the recovery of a flow upstream of said filtration membrane and the discharging of said flow into the environment via a second discharge pipe. As an alternative to this, when the underwater water treatment system includes several filtration membranes in parallel, the backwash step can consist in introducing the entire water flow coming into the underwater water treatment system toward just one of the filtration membranes, in recovering at least part of the filtrate of said filter and in conducting said filtrate up to the downstream face of a second filtration membrane situated in parallel with the first via the normal pipe for discharging the filtrate of said second membrane filtration, then in recovering said flow upstream of said membrane filtration and discharging said flow into the environment via a discharge pipe of the retentate of the second filtration membrane.

The injection of biocide into the water flow flowing in the underwater water treatment system according to the invention allows the phenomenon of biofouling to be reduced. The biocides well known for said application are, for example, DBNPA (dibromo nitrolo proprionamide) or isothiazoline.

In an advantageous manner, the invention allows the quantities of biocide used for cleaning the membranes in the methods of the prior art to be reduced, even the use thereof to be completely eliminated.

Other characteristics and advantages of the present invention will proceed from the description of the specific embodiments shown in the figures.

Figure 1:
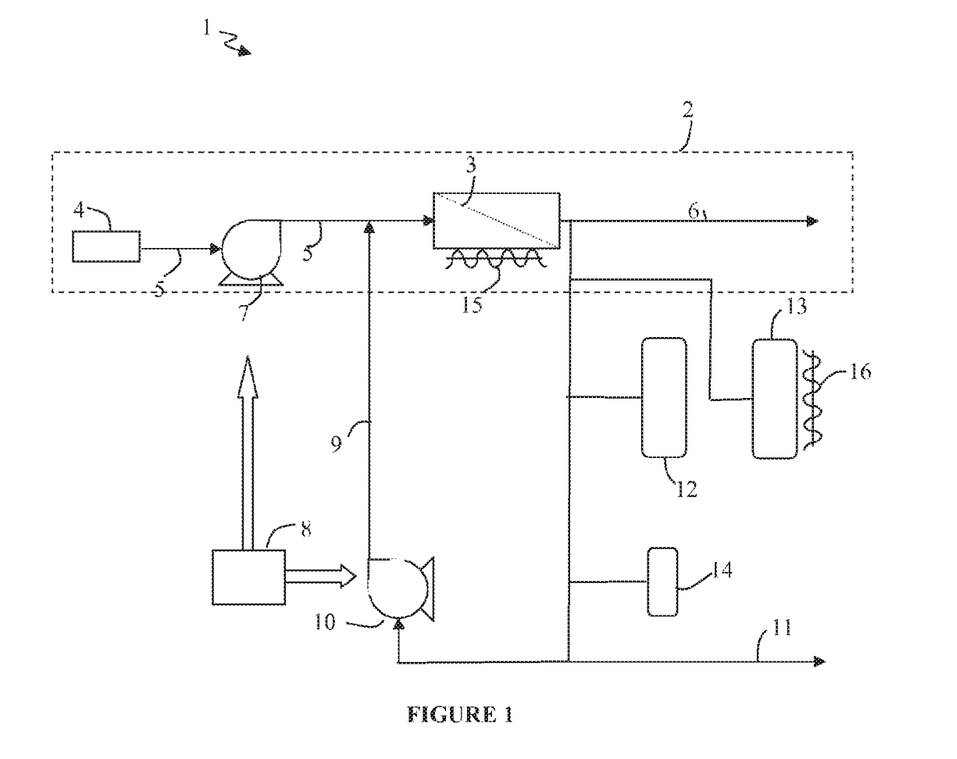
FIG. 1 is a schematic representation of an embodiment of the underwater water treatment unit according to the invention.

FIG. 1 is a schematic representation of an embodiment of the underwater water treatment unit according to the invention.

The underwater water treatment unit 1 includes an underwater water treatment system 2, itself including a filtration membrane 3, a water inlet 4 suitable for introducing in a flow of water drawn from the environment, a pipe 5 which connects the water inlet 4 to the filtration membrane 3, a discharge pipe 6 and a supply pump 7 which is placed on the pipe 5 connecting the water inlet 4 to the filtration membrane 3.

The underwater water treatment unit 1 also includes a means 8 for supplying the underwater unit with power, in particular for supplying the supply pump 7 and the cleaning pump 10.

Furthermore, the underwater water treatment unit 1 includes a hydraulic cleaning circuit 9 and a cleaning pump 10 which is placed in the hydraulic cleaning circuit 9. The hydraulic cleaning circuit 9 forms a loop which includes the filtration membrane 3. The hydraulic circuit also includes a discharge pipe 11.

The underwater water treatment unit 1 also includes two water storage tanks 12 and 13 and one cleaning product storage tank 14. Each tank is connected to the hydraulic cleaning circuit 9.

Finally, in the embodiment shown in FIG. 1, only the filtration membrane 3 and the water storage tank 13 are provided with heating means 15 and 16.

Figure 2:
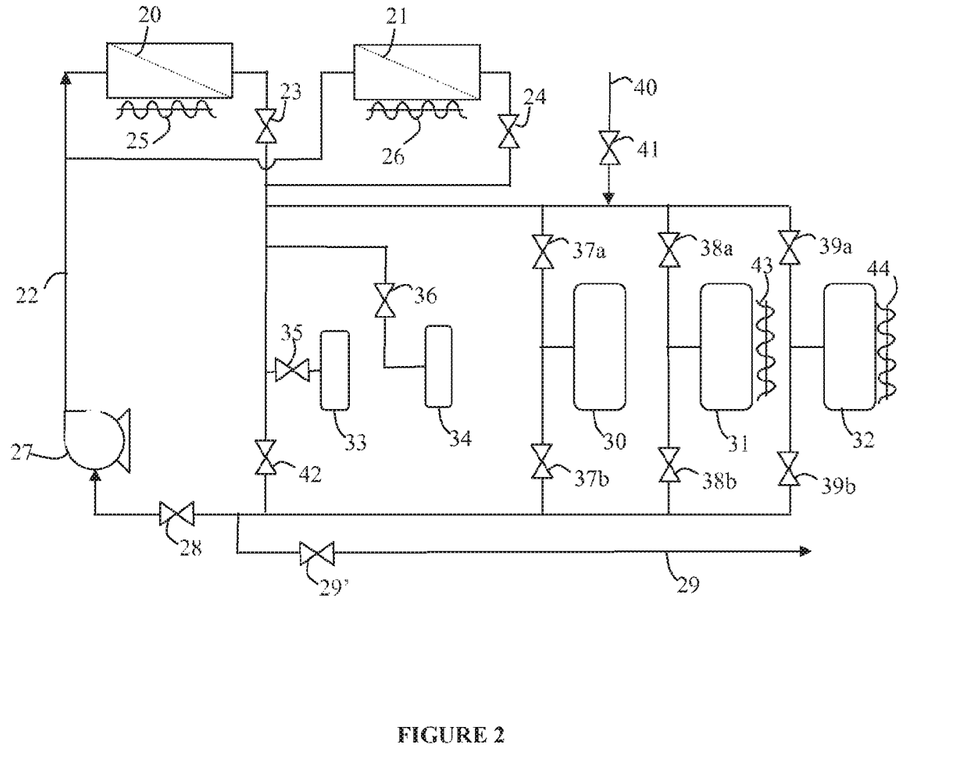
FIG. 2 is a schematic representation of an embodiment of the means for cleaning a unit according to the invention.

FIG. 2 is a schematic representation of an embodiment of the means for cleaning a unit according to the invention.

Said figure shows two filtration membranes 20 and 21, the membrane 20 can be an ultrafiltration membrane and the membrane 21 can be a nanofiltration membrane.

The hydraulic cleaning circuit 22 forms two loops, a first loop including the filtration membrane 20 and the second loop including the filtration membrane 21. The opening and closing of the circulating of the liquid in said two loops are controlled by way of valves 23 and 24. When the filtration membrane 20 needs cleaning, the valve 23 is opened and the valve 24 is closed. Conversely, when the filtration membrane 21 needs cleaning, the valve 24 is opened and valve 23 is closed.

Each membrane is provided with a heating means 25 and 26.

A cleaning pump 27 is placed in the hydraulic cleaning circuit 22. Furthermore, the hydraulic cleaning circuit 22 includes a valve 28 which allows the circulation of the flow in the hydraulic cleaning circuit 22 to be controlled, and a discharge pipe 29 which has a valve 29'.

The cleaning means also include three water tanks 30, 31 and 32, and two cleaning product tanks 33 and 34. Each tank is connected to the hydraulic cleaning circuit 22. The valves 35 and 36 are placed at the inlet of the cleaning product tanks 33 and 34, in order to be able to control the injection of cleaning product into the hydraulic cleaning circuit 22. The water storage tanks 30, 31 and 32 are themselves provided with pairs of valves 37a/37b, 38a/38b and 39a/39b. In an advantageous manner, said pairs of valves allow the injection of water into the hydraulic cleaning circuit 22 to be controlled, but equally they allow the tanks 30, 31 and 32 to be filled by a flow of water coming from the pipe 40. In a preferred manner, the water coming in through the pipe 40 is water obtained leaving the water treatment system. The filling of the tanks can be controlled by the valve 41 and by the valve 42.

The water storage tanks 31 and 32 are provided with heating means 43 and 44.

By way of example, a method according to the invention for cleaning the filtration membrane 20 is described below.

In order to clean the filtration membrane 20, the valve 23 is opened and the valve 24 is closed. The filtration membrane 20 is isolated from the water treatment system. The valves 28 and 42 are open whilst the discharge valve 29' is closed. The hydraulic cleaning circuit 22 thus forms a loop which includes the filtration membrane 20. Furthermore, the valves 35, 36, 37a/37b, 38a/38b and 39a/39b are closed, as well as the valve 41.

The water contained in the tank 30 is injected into the hydraulic cleaning circuit 22 by opening the valve 37b. The water is at the ambient outside temperature. Said water is made to circulate in the hydraulic cleaning circuit 22 using the cleaning pump 27.

The heating means 25 is switched on. This will enable the temperature of the filtration membrane 20 and of the water circulating in the hydraulic cleaning circuit 22 to be increased up to a temperature of between 15° C. and 40° C. inclusive.

When said temperature is reached, a cleaning product contained in the storage tank 33 is injected into the hydraulic cleaning circuit 22, by opening the valve 35.

When the membrane has been sufficiently cleaned, the contents of the hydraulic cleaning circuit 22 are discharged via the discharge pipe 29 by opening the valve 29'. Once the discharging step is finished, the valve 29' is re-closed.

Water contained in the tank 31 is then injected into the hydraulic cleaning circuit again by opening the valve 38b. The water contained in the tank 31 is at the temperature of the filtration membrane 20, that is to say at a temperature of between 15° C. and 40° C. inclusive. Said temperature has been obtained by heating the tank using the heating means 43. Said water is always made to circulate in the hydraulic cleaning circuit 22 using the cleaning pump 27.

When the rinsing of the filtration membrane 20 is completed, the contents of the hydraulic cleaning circuit 22 are once again discharged via the discharge pipe 29 by opening the valve 29'. Once the discharging step is finished, the valve 29' is re-closed.

Once, therefore, the cleaning process has been completed, the treatment of the water in the water treatment system can be resumed using the filtration membrane 20. Furthermore, it is possible to replace the water which has been used by injecting water obtained leaving the treatment system into the water storage tanks 30 and 31 via the pipe 40. To do this, the valves 37a, 38a and 41 are opened and the valves 37b, 38b and 42 are kept closed.

By way of example, a second method according to the invention for cleaning the filtration membrane 21 is described below.

In order to clean the filtration membrane 21, the valve 24 is opened and the valve 23 is closed. The filtration membrane 21 is isolated from the water treatment system. The valves 28 and 42 are open whilst the discharge valve 29' is closed. The hydraulic cleaning circuit 22 thus forms a loop which includes the filtration membrane 21. Furthermore, the valves 35, 36, 37a/37b, 38a/38b and 39a/39b are closed, as well as the valve 41.

The water contained in the tank 30 is injected into the hydraulic cleaning circuit 22 by opening the valve 37b. The water is at the ambient outside temperature. Said water is made to circulate in the hydraulic cleaning circuit 22 using the cleaning pump 27.

The heating means 26 is switched on. This will enable the temperature of the filtration membrane 21 and of the water circulating in the hydraulic cleaning circuit 22 to be increased up to a temperature of between 15° C. and 40° C. inclusive.

When said temperature is achieved, a cleaning product contained in the storage tanks 34 is injected into the hydraulic cleaning circuit 22 by opening the valve 36.

When the cleaning of the membrane is completed, the contents of the hydraulic cleaning circuit 22 are discharged via the discharge pipe 29 by opening the valve 29'. Once the discharging step is finished, the valve 29' is re-closed.

Water contained in the tank 31 is then once again injected into the hydraulic cleaning circuit by opening the valve 38b. The water contained in the tank 31 is at a temperature of the filtration membrane 21, that is to say between 15° C. and 40° C. Said temperature has been obtained by heating the tank 31 using the heating means 43. Said water is always made to circulate in the hydraulic cleaning circuit 22 using the cleaning pump 27.

When the rinsing of the filtration membrane 21 is completed, this time the cleaning product contained in the storage tank 33 is injected into the hydraulic cleaning circuit 22 by opening the valve 35.

When the cleaning of the membrane is completed, the contents of the hydraulic cleaning circuit 22 are discharged via the discharge pipe 29 by opening the valve 29'. Once the discharging step is finished, the valve 29' is re-closed.

Water contained in the tank 32 is then once again injected into the hydraulic cleaning circuit by opening the valve 39b. The water contained in the tank 32 is at a temperature of the filtration membrane 21, that is to say between 15° C. and 40° C. Said temperature has been obtained by heating the tank using the heating means 44. Said water is always made to circulate in the hydraulic cleaning circuit 22 using the cleaning pump 27.

When the rinsing of the filtration membrane 21 is completed, the contents of the hydraulic cleaning circuit 22 are once again discharged via the discharge pipe 29 by opening the valve 29'. Once the discharging step is finished, the valve 29' is re-closed.

Once, therefore, the cleaning process has been completed, the treatment of the water in the water treatment system can be resumed using the filtration membrane 21. Furthermore, the water which has been used is replaced by injecting water obtained leaving the treatment system into the water storage tanks 30, 31 and 32 via the pipe 40. To do this, the valves 37a, 38a, 39a and 41 are opened and the valves 37b, 38b, 39b and 42 are kept closed.

The embodiments above are intended to be illustrative and not limiting. Additional embodiments may be within the claims. Although the present invention has been described with reference to particular embodiments, workers skilled in the art will recognize that changes may be made in form and detail without departing from the spirit and scope of the invention.

Various modifications to the invention may be apparent to one of skill in the art upon reading this disclosure. For example, persons of ordinary skill in the relevant art will recognize that the various features described for the different embodiments of the invention can be suitably combined, un-combined, and re-combined with other features, alone, or in different combinations, within the spirit of the invention. Likewise, the various features described above should all be regarded as example embodiments, rather than limitations to the scope or spirit of the invention. Therefore, the above is not contemplated to limit the scope of the present invention.

The invention claimed is:

1. A method for cleaning a filtration membrane of an underwater unit including an umbilical connection for supplying the underwater unit with power;
   an underwater water treatment system which includes the filtration membrane, a water intake which is suitable to bring a flow of water drawn from the environment of the system into the underwater unit, a pipe connecting said water intake and said filtration membrane, a discharge pipe for treated water and a supply pump which is suitable for carrying out water filtration;
   a hydraulic cleaning circuit for cleaning said filtration membrane, said hydraulic cleaning circuit forming a loop between an inlet and an outlet of said filtration membrane, and having a discharge pipe;
   two water storage tanks, each water tank being connected to the hydraulic cleaning circuit;

one cleaning product tank storing a cleaning product selected from among an acid and a base, the cleaning product tank being connected to the hydraulic cleaning circuit;

one cleaning pump which is suitable for setting a liquid in the hydraulic cleaning circuit into motion;

said filtration membrane being provided with a filtration membrane heating element, and one of the water storage tanks being provided with a heating element, said method including the sequential steps of:

a) cutting of the water intake into said filtration membrane;

b) injecting water contained in one of the water storage tanks into the hydraulic cleaning circuit, and making said water circulate in the loop using the cleaning pump;

c) heating the filtration membrane up to a temperature of between 15° C. and 40° C. inclusive using the filtration membrane heating element, the heating of the filtration membrane causing the water circulating in the loop to heat to a temperature of between 15° C. and 40° C.;

d) injecting the cleaning product contained in the cleaning product tank into the water circulating in the loop, while operating the heating element used to heat the filtration membrane in such a manner that the temperature of the water circulating in the loop remains stable and maintaining a circulation of a flow containing the cleaning product through the filtration membrane to clean the filtration membrane;

e) discharging the contents of the hydraulic cleaning circuit via the discharge pipe of the loop;

f) injecting water contained in the water storage tank provided with the heating element into the hydraulic cleaning circuit again, and making said water circulate in the loop; and g) discharging the contents of the hydraulic cleaning circuit via the discharge pipe of the loop, wherein the water injected into the hydraulic cleaning circuit during step f) is heated to a temperature of between 15° C. and 40° C. inclusive due to the heating element of the water storage tank.

2. The method for cleaning as claimed in claim 1, wherein the cleaning product injected into the hydraulic cleaning circuit during step d) is an acid.

3. The method for cleaning as claimed in claim 1, wherein said method includes, between step f) and step g), the steps:

d') injecting a second cleaning product that is different from the cleaning product injected during step d) into the hydraulic cleaning circuit, said second cleaning product being contained in one storage tank;

e') discharging the contents of the hydraulic cleaning circuit via the discharge pipe of the hydraulic cleaning circuit; and f') injecting water contained in one of the two water storage tanks into the hydraulic cleaning circuit again, and making said water circulate in the loop.

4. The method for cleaning as claimed in claim 3, wherein the cleaning product injected into the hydraulic cleaning circuit during step d) is a base and the temperature obtained during step c) is between 30° C. and 40° C. and the cleaning product injected into the hydraulic cleaning circuit during step d') is an acid.

5. The method for cleaning as claimed in claim 1, wherein said method subsequently includes the steps:

h) resuming a water treatment in the water treatment system of the unit; and i) replacing the water which has been used during steps b) and f), by injecting water obtained leaving the treatment system into the water storage tanks.

6. The method for cleaning as claimed in claim 1, wherein the underwater water treatment unit is placed underwater, at a minimum depth of 500 meters.

7. The method for cleaning as claimed in claim 1, wherein the contents of the hydraulic cleaning circuit are discharged into the water storage tanks which have been drained following step b).

8. The method for cleaning as claimed in claim 5, wherein the water injected into the hydraulic cleaning circuit during step f' is heated to a temperature of between 15° and 40° C. inclusive thanks to the at least one heating element of the at least two water storage tanks.

9. The method for cleaning as claimed in claim 2, wherein the temperature obtained during step c) is between 25° C. and 35° C.

10. The method for cleaning as claimed in claim 1, wherein the cleaning product injected into the hydraulic cleaning circuit during step d) is a base and the temperature obtained during step c) is between 30° C. and 40° C.

11. A method for cleaning a filtration membrane of an underwater unit including a battery supplying the underwater unit with power;

an underwater water treatment system which includes the filtration membrane, a water intake which is suitable to bring a flow of water drawn from the environment of the system into the underwater unit, a pipe connecting said water intake and said filtration membrane, a discharge pipe for treated water and a supply pump which is suitable for carrying out water filtration;

a hydraulic cleaning circuit for cleaning said filtration membrane, said hydraulic cleaning circuit forming a loop between an inlet and an outlet of said filtration membrane, and having a discharge pipe;

two water storage tanks, each water tank being connected to the hydraulic cleaning circuit;

one cleaning product tank storing a cleaning product selected from among an acid and a base, the cleaning product tank being connected to the hydraulic cleaning circuit;

one cleaning pump which is suitable for setting a liquid in the hydraulic cleaning circuit into motion;

said filtration membrane being provided with a filtration membrane heating element, and one of the water storage tanks being provided with a tank heating element, said method including the sequential steps of:

a) cutting of the water intake into said filtration membrane;

b) injecting water contained in one of the water storage tanks into the hydraulic cleaning circuit, and making said water circulate in the loop using the cleaning pump;

c) heating the filtration membrane up to a temperature of between 15° C. and 40° C. inclusive using the filtration membrane heating element, the heating of the filtration membrane causing the water circulating in the loop to heat to a temperature of between 15° C. and 40° C.;

d) injecting the cleaning product contained in the cleaning product tank into the water circulating in the loop, while operating the heating element used to heat the filtration membrane in such a manner that the temperature of the water circulating in the loop remains stable and maintaining a circulation of a flow containing the cleaning product through the filtration membrane to clean the filtration membrane;

e) discharging the contents of the hydraulic cleaning circuit via the discharge pipe of the loop;
f) injecting water contained in the water storage tank provided with the tank heating element into the hydraulic cleaning circuit again, and making said water circulate in the loop; and
g) discharging the contents of the hydraulic cleaning circuit via of the discharge pipe the loop again, wherein the water injected into the hydraulic cleaning circuit during step f) is heated to a temperature of between 15° C. and 40° C. inclusive due to the tank heating element of the water storage tank.

\* \* \* \* \*